United States Patent
Xiao et al.

(10) Patent No.: US 11,251,906 B2
(45) Date of Patent: Feb. 15, 2022

(54) CONDITIONAL HARDWARE ACCELERATION OF SECURE FORWARD ERROR CORRECTION (FEC) PROCESSING

(71) Applicant: Fortinet, Inc., Sunnyvale, CA (US)

(72) Inventors: Benzheng Xiao, Surrey (CA); Xudong Li, Surrey (CA); Mingxing Nan, Burnaby (CA)

(73) Assignee: Fortinet, Inc., Sunnyvale, CA (US)

(*) Notice: Subject to any disclaimer, the term of this patent is extended or adjusted under 35 U.S.C. 154(b) by 130 days.

(21) Appl. No.: 16/836,840

(22) Filed: Mar. 31, 2020

(65) Prior Publication Data

US 2021/0306099 A1    Sep. 30, 2021

(51) Int. Cl.
| | |
|---|---|
| *H04L 1/00* | (2006.01) |
| *H03M 13/03* | (2006.01) |
| *H04L 12/66* | (2006.01) |
| *G06F 9/50* | (2006.01) |
| *H04L 29/06* | (2006.01) |

(52) U.S. Cl.
CPC .......... *H04L 1/0078* (2013.01); *G06F 9/5027* (2013.01); *H03M 13/03* (2013.01); *H04L 1/0045* (2013.01); *H04L 12/66* (2013.01); *H04L 63/0485* (2013.01)

(58) Field of Classification Search
CPC ..... H04L 1/0078; H04L 1/0045; H04L 12/66; H04L 63/0485; H03M 13/03; G06F 9/5027
See application file for complete search history.

(56) References Cited

U.S. PATENT DOCUMENTS

| | | | |
|---|---|---|---|
| 6,377,782 B1* | 4/2002 | Bishop ................ | H04L 12/2801 370/277 |
| 2017/0188412 A1* | 6/2017 | Noriega ................ | H04W 88/08 |
| 2017/0353246 A1* | 12/2017 | Frankel ................ | H04B 10/40 |

* cited by examiner

*Primary Examiner* — Asghar H Bilgrami

(57) ABSTRACT

It is determined whether hardware acceleration is available for the incoming data packet. Responsive to hardware acceleration availability, and based on the received FEC conditions, it is determined, for a session associated with the incoming data packet, whether to hardware decrypt the incoming data packet before decoding the incoming data packet or to hardware decrypt after decoding the incoming data packet.

4 Claims, 4 Drawing Sheets

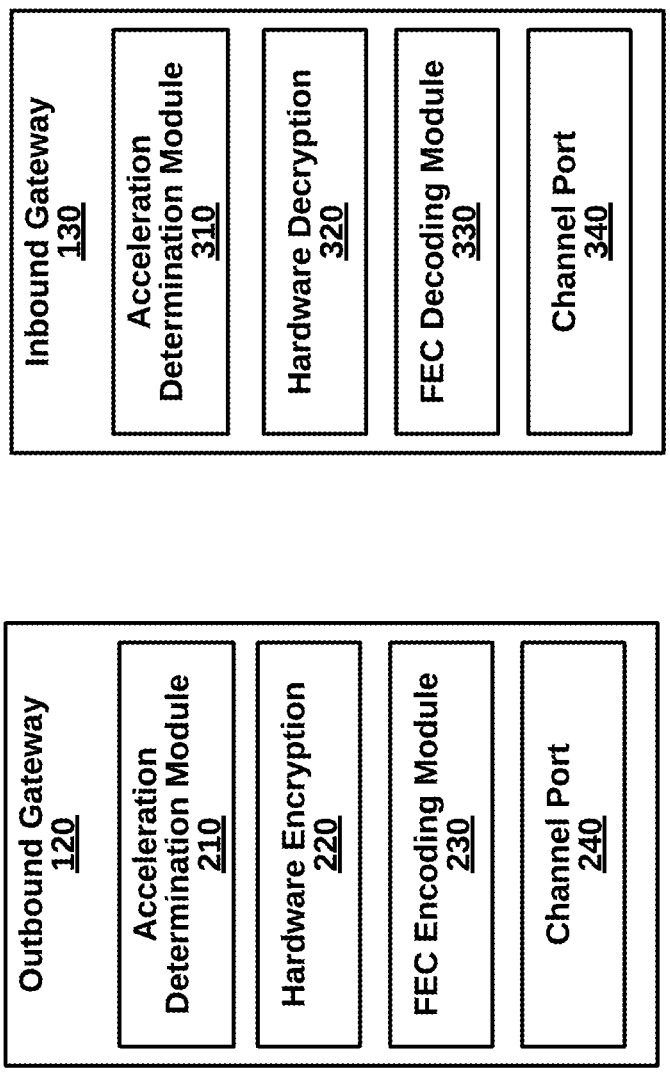

__

CONDITIONAL HARDWARE ACCELERATION OF SECURE FORWARD ERROR CORRECTION (FEC) PROCESSING

FIELD OF THE INVENTION

The invention relates generally to computer networking, and more specifically, to conditional hardware acceleration of FEC processing.

BACKGROUND

FEC or forward error correction improves the quality of networks by detecting errors in data packets incurred during transmission. For example, errors in data packets can be introduced by interference to analog signals carrying the data packets. Generally, a sender in a transmission encodes the message in a redundant way, such as be using an error-correcting code (ECC). The redundancy allows errors to be detected and sometimes are self-correcting.

Traditionally, FEC is performed in software. While software provides flexibility for implementing new protocols, it slows down processing of data packets. And while hardware provides faster processing of protocols, the changing nature of FEC standards makes hardware design of FEC difficult.

What is needed is a robust technique for conditional hardware acceleration of FEC processing, to improve network performance.

SUMMARY

The above-mentioned shortcomings are addressed by a automatically synching firewall rules and policies over a data communication network for network security over mobile devices that are roaming on a private carrier network.

In one embodiment, an incoming data packet of a plurality of packets is received for processing to inbound transmission. FEC conditions are received from local storing, from the cloud, a software app, or any appropriate source.

In another embodiment, it is determined whether hardware acceleration is available for the incoming data packet. Responsive to hardware acceleration availability, and based on the received FEC conditions, it is determined, for a session associated with the incoming data packet, whether to hardware decrypt the incoming data packet before decoding the incoming data packet or to hardware decrypt after decoding the incoming data packet.

In yet another embodiment, the incoming data packets are processed according to order of hardware decryption relative to decoding. The incoming data packet are transmitted over the local communication network.

Advantageously, network performance is improved with increased throughput and reduced latency. Furthermore, performance of the network device is improved.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 2 is a more detailed block diagram illustrating an outbound gateway of the system of FIG. 1, respectively, according to one embodiment.

FIG. 3 is a more detailed block diagram illustrating an inbound gateway of the system of FIG. 1, respectively, according to one embodiment.

DETAILED DESCRIPTION

Systems, computer-implemented methods, and (non-transitory) computer-readable mediums for conditional hardware acceleration of secure FEC processing. One of ordinary skill in the art will recognize many additional variations made possible by the succinct description of techniques below.

Figure 1:
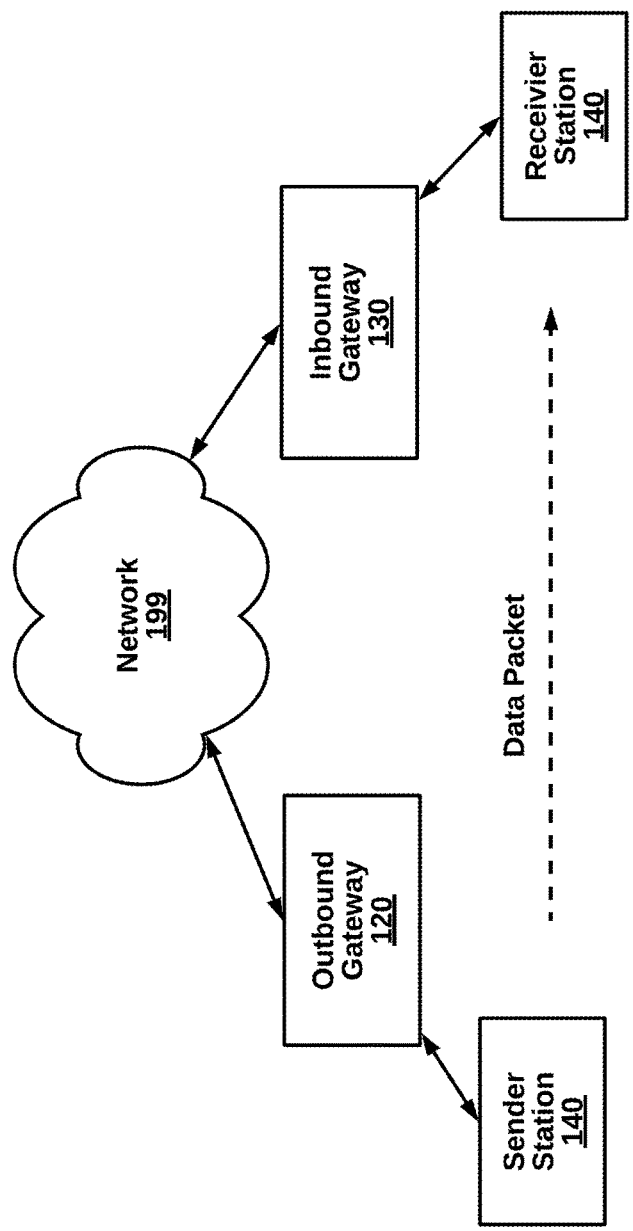
FIG. 1 is a block diagram illustrating a system for conditional hardware acceleration of secure FEC processing, according to an embodiment.

Systems for Conditional Acceleration of Secure FEC Processing (FIGS. 1-3)

FIG. 1 is a high-level block diagram illustrating a firewall system 100 for conditional acceleration of secure FEC processing, according to one embodiment. The system 100 includes a sender device 110, an outbound gateway 120, an inbound gateway 130, and a receiver device 140. Many other embodiments are possible, for example, with access points, more or fewer stations, additional components, such as access points, routers, switches, and the like. A particular sending device and a particular receiving device is a temporary role that switches for packets traveling the opposite direction.

In one example of data flow in the system 100, a bitstream sent to the sender device 110 is modified with some FEC bits and the modified bitstream is converted to an analog signal The network 199 couples components of the system 100 in data communication. The outbound gateway 120 and the inbound gateway 130 are preferably connected to the network 199 via hardwire. The sender device 110 and the receiver device 140 are wirelessly connected to the outbound gateway 120 and the inbound gateway 130, respectively, for access to the network 199 indirectly. The network 199 can be a data communication network such as the Internet, a WAN, a LAN, can be a cellular network, or a hybrid of different types of networks. Thus, the system 100 can be a LAN or include cloud-based devices.

In one example of how data flows through the system 100, a data packet is initially transmitted from the sender device 110 to the outbound gateway 120. In turn, the outbound gateway 120 sends a secured FEC data packet that has been encoded and encrypted over the network 199 to the inbound gateway 130. Finally, a data packet that has been decrypted and decoded is transmitted to the receiver device 140.

The sender device 110 and the receiver device 140 can be a smartphone running a chat application or displaying a video stream.

The outbound gateway 120 secures and FEC encrypts data packets sent outbound from a local network to the network 199. The components of the outbound gateway 120 are shown in detail in FIG. 2. An acceleration determination module 210 decides whether hardware acceleration is available for a data packet or session or packets. In one embodiment, FEC conditions that affect security or coding or data packets are taken into consideration. Also network conditions, network status, current throughput, network congestions, and other factors can be considered.

A hardware encryption 220 is an ASIC, network processor, or other hardware processing unit that encrypts FEC data packets for security. For example, data packets can be encrypted using IPSec. The FEC encoding module 230 can be implemented in executable software code, in some embodiments. This leaves flexibility for changing standards in FEC encoding. The order of encrypting and encoding can be reversed such that the data packets are encoded first and then encrypted.

A channel port 240 provides a physical connection to a channel, such as Ethernet or Coax. In some embodiments, an antennae accesses a wireless channel.

The inbound gateway 130 FEC decrypts and decodes data packets sent inbound to a local network from the network 199. The components of the outbound gateway 120 are shown in detail in FIG. 3. An acceleration determination module 310 uses FEC factors to determine availability of hardware acceleration.

A hardware decryption 320 decrypts the secure FEC data packets received. An FEC decoding module 330 decodes the FEC data packet, using software code. In some embodiments, decoding is performed prior to decryption.

A channel port 340 is similar to the channel port 240.

Figure 5:
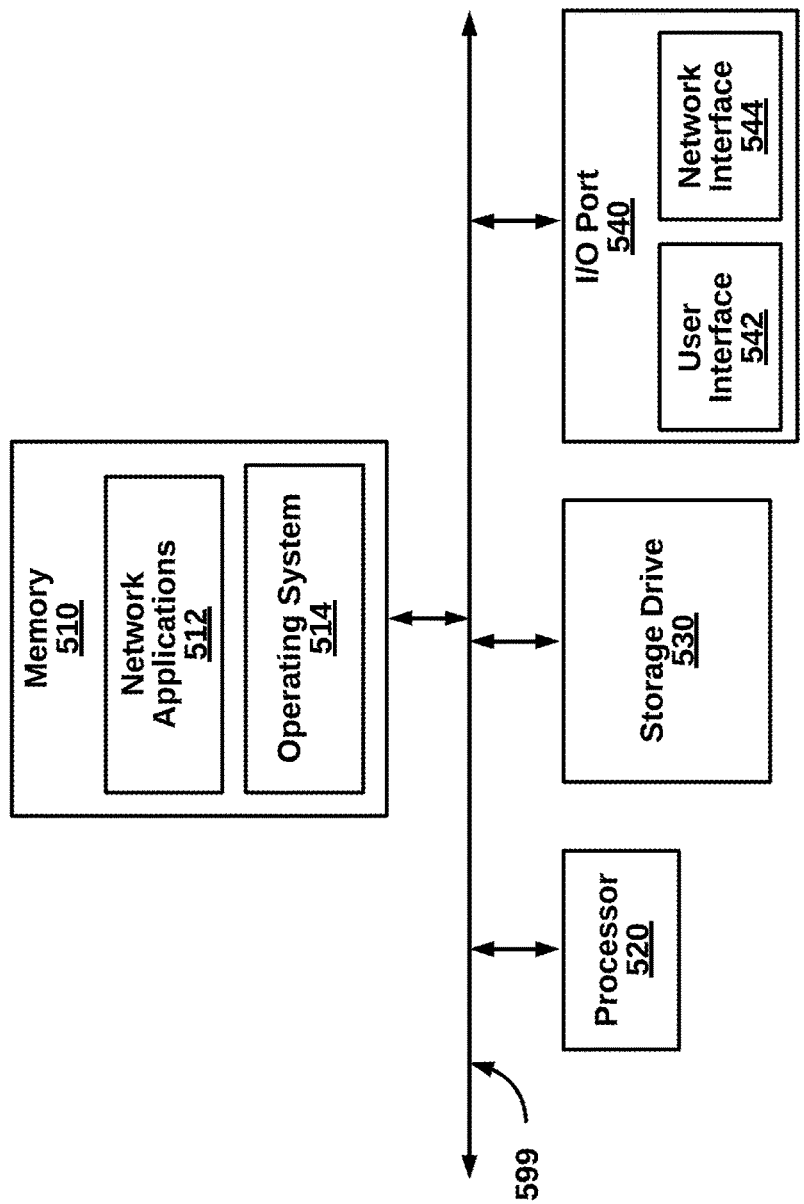
FIG. 5 is a block diagram illustrating an exemplary computing device, according to one embodiment.

The network components of the system 100 can implemented in any of the computing devices discussed herein, for example, a personal computer, a laptop computer, a tablet computer, a smart phone, a mobile computing device, a server blade, a cloud-based device, a virtual device (e.g., execution within a virtual container), an Internet appliance, or any of the computing devices described herein, using hardware and/or software (see e.g., FIG. 5). In one embodiment, a dedicated processor of a multi-core processor or a dedicated thread of a multi-threaded operating system is set for an individual container for processing efficiency.

II. Methods for Conditional Acceleration of Secure FEC Processing (FIG. 4)

Figure 4:
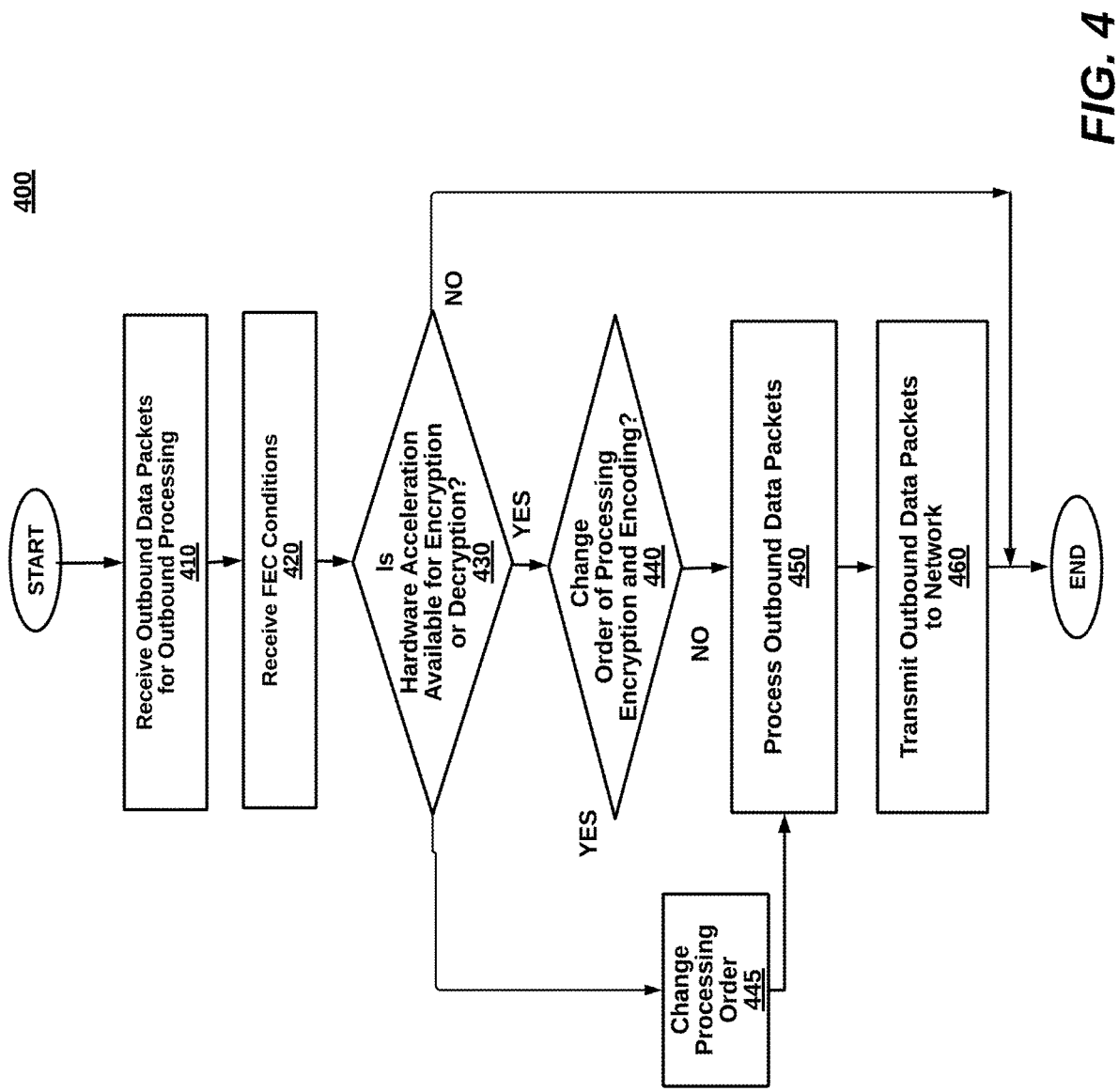
FIG. 4 is a flow chart illustrating a method for conditional hardware acceleration of secure FEC processing, according to an embodiment.

FIG. 4 is a flow chart illustrating a method 500 for conditional hardware acceleration of secure FEC, according to an embodiment. The method 400 can be implemented, for example, by the system 100 of FIG. 1. The steps are merely representative groupings of functionality, as there can be more or fewer steps, and the steps can be performed in different orders.

At step 410, an incoming data packet of a plurality of packets is received for processing to inbound transmission.

At step 420, FEC conditions are received from local storing, from the cloud, a software app, or any appropriate source. There can be various FEC factors or conditions, such as FEC algorithm, network status, system throughput, network congestion, priority, quality of service, and the like.

At step 430, it is determined whether hardware acceleration is available for the incoming data packet. Acceleration can be manually or automatically enabled. Availability of acceleration can be based on network conditions and/or device conditions, or other factors. Responsive to hardware acceleration availability, and based on the received FEC conditions, at step 440, it is determined, for a session associated with the incoming data packet, whether to hardware decrypt the incoming data packet before decoding the incoming data packet or to hardware decrypt after decoding the incoming data packet.

At step 450, the incoming data packets are processed according to order of hardware decryption relative to decoding. At step 460, the incoming data packet are transmitted over the local communication network.

III. Generic Computing Device (FIG. 5)

FIG. 5 is a block diagram illustrating an example computing device 500 for use in the system 100 of FIG. 1, according to one embodiment. The computing device 500 is implementable for each of the components of the system 100. The computing device 500 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 500, of the present embodiment, includes a memory 510, a processor 520, a storage drive 530, and an I/O port 540. Each of the components is coupled for electronic communication via a bus 599. Communication can be digital and/or analog, and use any suitable protocol.

The memory 510 further comprises network applications 512 and an operating system 514. The network applications 512 can include a web browser, a mobile application, an application that uses networking, a remote application executing locally, a network protocol application, a network management application, a network routing application, or the like.

The operating system 514 can be one of the Microsoft Windows® family of operating systems (e.g., Windows 94, 98, Me, Windows NT, Windows 2000, Windows XP, Windows XP x44 Edition, Windows Vista, Windows CE, Windows Mobile, Windows 6 or Windows 8), Linux, HP-UX, UNIX, Sun OS, Solaris, Mac OS X, Alpha OS, AIX, IRIX32, or IRIX44. Other operating systems may be used. Microsoft Windows is a trademark of Microsoft Corporation.

The processor 520 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the storage drive 530.

The storage drive 530 can be any non-volatile type of storage such as a magnetic disc, EEPROM (electronically erasable programmable read-only memory), Flash, or the like. The storage drive 530 stores code and data for applications.

The I/O port 540 further comprises a user interface 642 and a network interface 544. The user interface 442 can output to a display device and receive input from, for example, a keyboard. The network interface 544 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in a network gateway device of a local area network to a wide area network, for encoding and decoding messages with conditional hardware acceleration for security encryption and decryption, the method comprising the steps of:
    receiving an incoming data packet of a plurality of packets for processing to inbound transmission;
    receiving FEC conditions;
    determining whether hardware acceleration is available for the incoming data packet;
    responsive to hardware acceleration availability, and based on the received FEC conditions, determining, for a session associated with the incoming data packet, whether to hardware decrypt the incoming data packet before decoding the incoming data packet or to hardware decrypt after decoding the incoming data packet;
    processing the incoming data packet according to order of hardware decryption relative to decoding; and
    transmitting the incoming data packet over the local communication network.

2. The method of claim 1, further comprising:
    receiving an outgoing data packet of the plurality of packets for processing to outbound transmission;
    determining whether hardware acceleration is available for the outgoing data packet;
    responsive to hardware acceleration availability, and based on the FEC conditions, determining whether to hardware encrypt the outgoing data packet before encoding the outgoing data packet or to hardware encrypt after decoding the incoming data packet;
    processing the outgoing data packet according to order of hardware encryption relative to encoding; and
    transmitting the outgoing data packet over the data communication network.

3. The method of claim 1, wherein the hardware decrypting comprises IPSec decryption.

4. A non-transitory computer-readable media storing instructions that, when executed by a processor, perform a computer-implemented method in a network gateway device of a local area network to a wide area network, for encoding and decoding messages with conditional hardware acceleration for security encryption and decryption, the method comprising the steps of:
    receiving an incoming data packet of a plurality of packets for processing to inbound transmission;
    receiving FEC conditions;
    determining whether hardware acceleration is available for the incoming data packet;
    responsive to hardware acceleration availability, and based on the received FEC conditions, determining, for a session associated with the incoming data packet, whether to hardware decrypt the incoming data packet before decoding the incoming data packet or to hardware decrypt after decoding the incoming data packet;
    processing the incoming data packet according to order of hardware decryption relative to decoding; and
    transmitting the incoming data packet over the local communication network.

* * * * *